A. F. GUE.
Car-Brakes.
No. 151,118. Patented May 19, 1874.
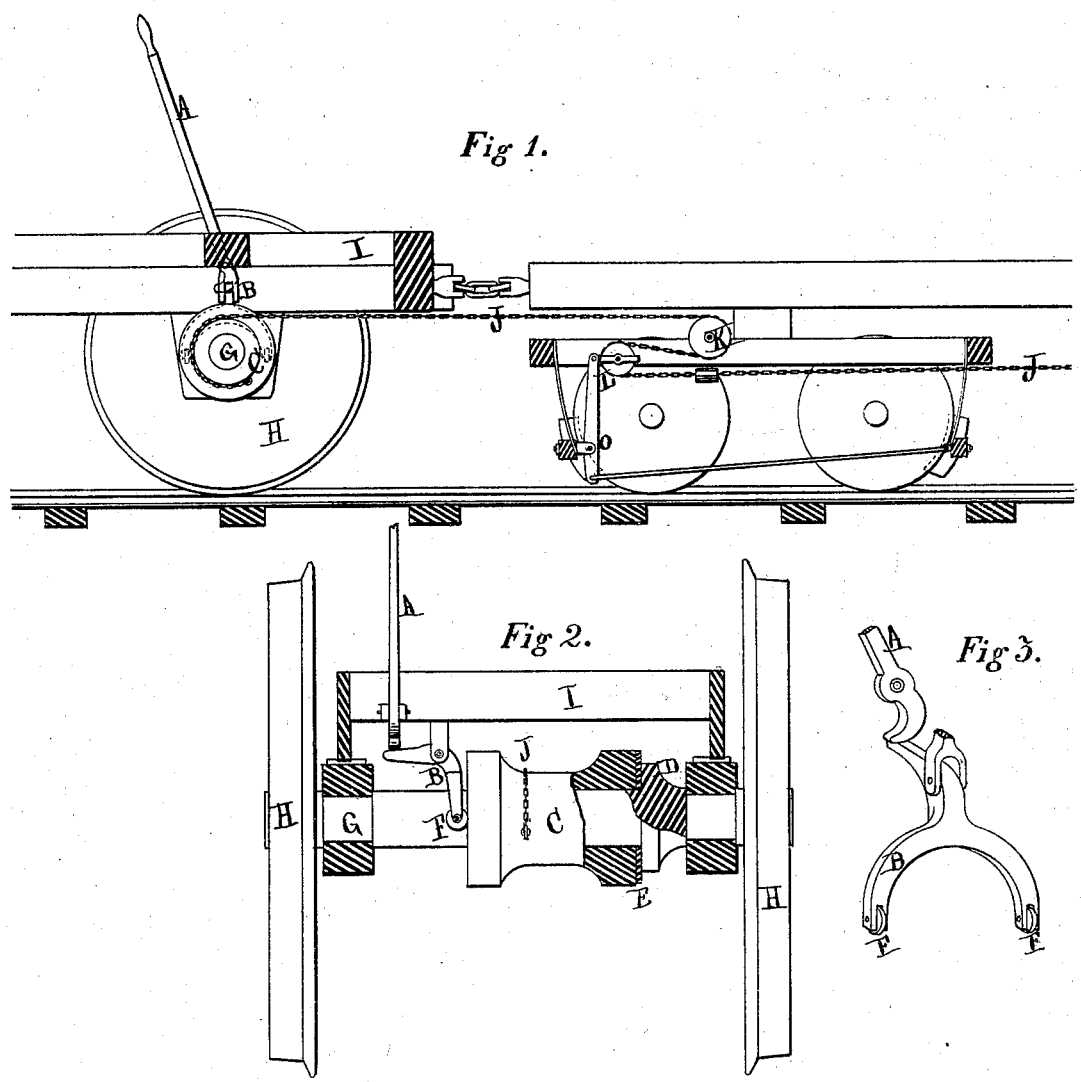
ATTEST:
Wm. P. Spalding
Chas. E. Duestro
INVENTOR: A. F. Gue
By Attorney
Thos. S. Sprague

UNITED STATES PATENT OFFICE.

ALBERT F. GUE, OF EASTMANVILLE, MICHIGAN, ASSIGNOR OF ONE-HALF HIS RIGHT TO JAMES M. KELLEY AND GEORGE E. PLUMBE, OF AUSTIN, ILLINOIS.

IMPROVEMENT IN CAR-BRAKES.

Specification forming part of Letters Patent No. 151,118, dated May 19, 1874; application filed January 7, 1874.

*To all whom it may concern:*

Be it known that I, ALBERT F. GUE, of Eastmanville, in the county of Ottawa and State of Michigan, have invented an Improvement in Car-Brakes, of which the following is a specification:

The nature of this invention relates to an improvement in continuous brakes for railway-trains, the object of the invention being to place the control of the brakes under the engineer or some other person at any specified point in the train; and it consists in a spool preferably sleeved upon the hind driving-axle of the engine, and having one end furnished with an oiled friction-pad, which presses against and is revolved by a stationary collar upon such axle, said spool being forced into contact by friction-wheels upon the forked clutch of a lever, the several parts constructed and arranged as more particularly hereinafter described.

Figure 1 is a central longitudinal vertical section of the foot-plate of a locomotive and the forward truck of its tender, showing the application of the brakes. Fig. 2 is a sectional elevation of the hind driving-axle. Fig. 3 is a perspective view of the lower end of the lever and the clutch.

In the drawing, A represents a hand-lever pivoted in a slot in the foot-board, and is curved at its lower end to form a cam, which presses down the horizontal arm of a clutch, B, pivoted at its angle to a fork, $a$, pendent from the foot-board. The pendent end of the clutch is forked to embrace the hind driving-axle G, on which is a stationary collars, D, next which is an oiled friction-pad, E. At the ends of the clutch-forks friction-wheels F F are journaled, which bear against the end of a spool, C, sleeved upon the axle when the lever is thrown forward, forcing its other end against the pad and the latter against the collar, thus causing the spool to rotate with the axle and wind upon it the brake-chain J. H H are the rear driving-wheels, and I is the foot-board of the locomotive. M are oil-cups through which to lubricate the spool. The chain extends from the spool around a sheave, K, on the fore part of the front tender-truck, thence around a sheave, L, on the upper end of the brake-lever O, thence to the other brakes in the train in like manner. The brakes of each truck being connected to the one lever, tension on the chain is thus transferred to them. The oiled friction-pad and the rollers F F prevent any unnecessary or excessive strain on the brake-chain after the required tension is obtained. If desired, a dynamometer can readily be attached to the brake-chain or spool to indicate the degree of tension.

I am aware that it is not original with me to combine in a car-brake a fixed collar upon an axle with a movable spool actuated by levers into contact with the collar, and I do not claim to have been the first to conceive of such a combination; but What I do believe to be original with me, and what I claim, is—

In a car-brake, the combination of the collar D, the spool C, having oiled pads E, and the forked clutch B, having friction-wheels F, all constructed and combined substantially as described and shown.

ALBERT F. GUE.

Witnesses:
 WM. H. LOTZ,
 N. E. BORCH.